No. 767,268. PATENTED AUG. 9, 1904.
C. FELSING, Jr.
MACHINE FOR COVERING WIRE WITH RUBBER OR THE LIKE.
APPLICATION FILED MAR. 15, 1902. RENEWED JUNE 8, 1904.
NO MODEL.
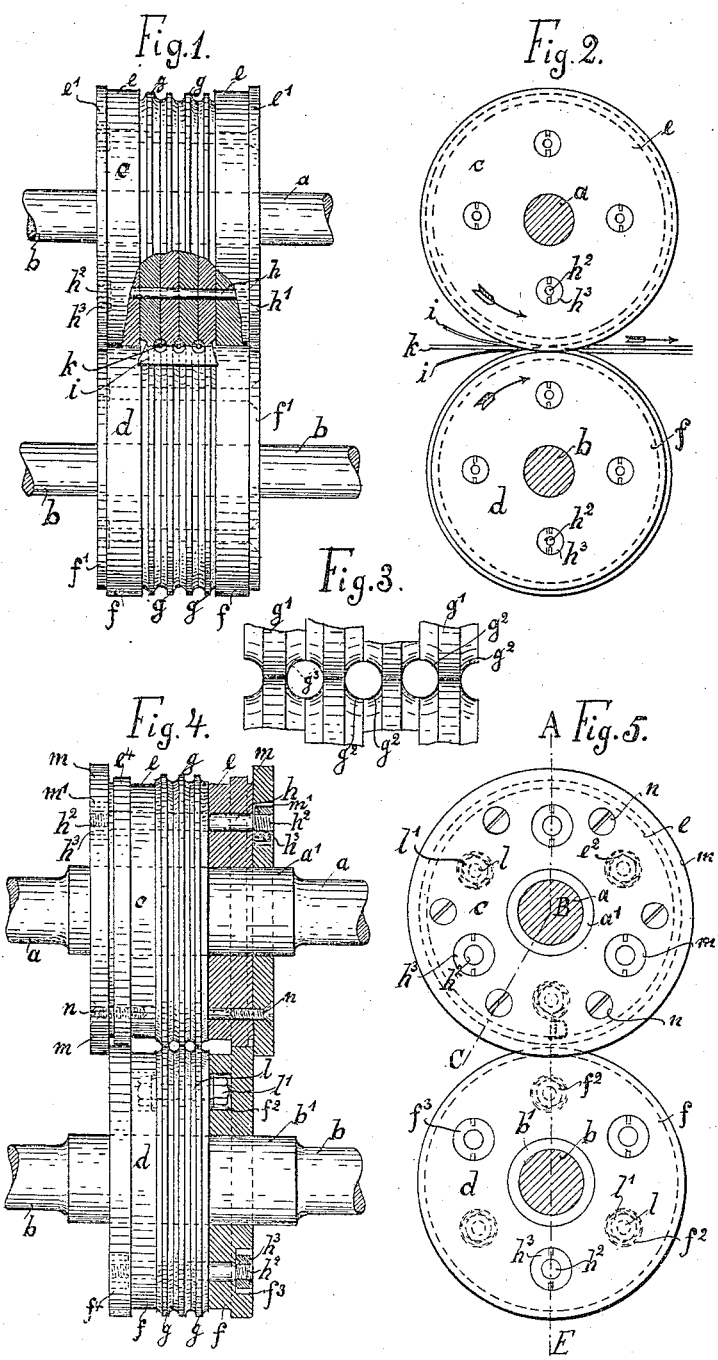

No. 767,268. Patented August 9, 1904.

UNITED STATES PATENT OFFICE.

CONRAD FELSING, JR., OF COEPENICK, GERMANY.

MACHINE FOR COVERING WIRE WITH RUBBER OR THE LIKE.

SPECIFICATION forming part of Letters Patent No. 767,268, dated August 9, 1904.

Application filed March 15, 1902. Renewed June 8, 1904. Serial No. 211,669. (No model.)

*To all whom it may concern:*

Be it known that I, CONRAD FELSING, Jr., a subject of the King of Prussia, Emperor of Germany, residing at Coepenick, near Berlin, in the Kingdom of Prussia and German Empire, have invented certain new and useful Improvements in Machines for Covering Wire with Rubber or the Like, of which the following is a specification.

My invention relates to machines for covering wire with rubber, gutta-percha, and the like, the object of my invention being a special construction of the grooved rollers or cylinders forming an essential part of said machines and intended for pressing the rubber, gutta-percha, or the like onto the periphery of the wire to be covered.

Further, my invention consists of certain parts, details, and combinations of my improved grooved rollers or cylinders.

In the accompanying drawings, forming a part of this specification, and in which similar letters of reference indicate corresponding parts throughout the several views, Figure 1 is a side view, partly in section, of two grooved rollers meshing together; Fig. 2, a front view of same; Fig. 4, a side view, partly in section, on the lines A B C and D E, Fig. 5, of two rollers of somewhat different construction; Fig. 5, a front view of the rollers shown in Fig. 4. Fig. 3 represents, on a larger scale, broken-off extremities of the disks forming a part of my improved grooved rollers or cylinders, said extremities of disks meeting together, as to be seen in Figs. 1 and 2.

Referring, primarily, to Figs. 1, 2, and 3, $a$ and $b$ represent the shafts upon which the grooved rollers $c$ and $d$ are keyed. Between the two lateral flanges $e$ of the roller $c$ and the two lateral flanges $f$ of the roller $d$ are arranged the series of disks $g$, each individual disk $g$ being formed with an annular projecting surface $g'$, to each side of which is adjacent an annular congé or concave quarter-round $g^2$, Fig. 3, so that when the lateral surfaces of the disks $g$ meet together the congés $g^2$ $g^2$, which lie opposite, form together a complete semicircular groove $g^3$, Fig. 3. The flanges $e$ and $f$ are made of cast-iron or other suitable material, while the disks $g$ are preferably made of hardened steel. The lateral flanges $e$ and $f$, together with the corresponding disks $g$, are held together by means of the bolts $h$, provided at the one end with a conical head $h'$, fitted into a corresponding recess of the flanges $e$ or $f$, respectively, and at the other end with a threaded portion $h^2$, on which is screwed the nut $h^3$, received by a corresponding recess of said disk $e$ or $f$. The flanges $e$ are both provided with a shoulder $e'$, while the flanges $f$ are both formed with an annular recess $f'$, said annular shoulders $e'$ and recesses $f'$ being adapted to mesh together when the projecting surfaces $g'$ of the disks $g$ meet together. It will be seen that the disks $g$ form together a rolling track, presenting alternately a projecting surface $g'$, adapted to sever or cut the rubber strips or bands $i$ intended for covering the wire $k$, Fig. 2, and a divided semicircular groove, as the latter is formed of two congés abutting together.

Fig. 2 illustrates the mode of operation of the grooved rollers or cylinders $e$ $f$, the finished or covered wire leaving the rollers in the direction of the arrow on the right of Fig. 2.

Figs. 4 and 5 show an arrangement differing only in some constructive details from the one described above.

On the shafts $a$ and $b$, provided with the bosses $a'$ and $b'$, respectively, are keyed the rollers or cylinders $c$ and $d$, essentially composed of the lateral flanges $e$ and $f$, respectively, and of the individual disks $g$, the formation of which answers exactly to the construction above described, and shown plainly in Figs. 1 and 3 of the drawings. The flanges $e$ and $f$, together with the corresponding disks $g$, are held together by means of the bolts $h$, on the threaded ends $h^2$ of which are screwed the nuts $h^3$. Besides, the disks $g$, taken as a whole, are held together by means of the bolts $l$ and nuts $l'$, received by the corresponding hollows or recesses $e^2$ and $f^2$, provided in the flanges $e$ and $f$, respectively. Further, the upper roller $c$ is provided on both sides with disks $m$, connected to the flanges by means of the screws $n$. The nuts $h^3$ of roller $d$ are sunk into corresponding recesses $f^3$ of the flanges $f$, while the nuts $h^3$ of roller $c$ are received by corresponding bores or apertures $m'$ in the disks $m$. As to be seen, the side disks $m$ of the upper roller $c$ serve to guide the lower roller $d$—that is, to prevent a lateral displacement of said roller $d$. Further, the rollers $c$ and $d$ are kept at a proper axial distance from each other by means of the shoulders $e^4$ and $f^4$ of the flanges $e$ and $f$, respectively.

The mode of operation of the rollers shown in Fig. 4 corresponds exactly to the one of the rollers represented in Figs. 1 and 2 of the drawings.

Having thus described my invention, what I claim, and desire to secure by Letters Patent of the United States, is—

1. In grooved rollers for covering wire with rubber or the like, the combination of two lateral flanges, and a series of grooved disks disposed between said lateral flanges, each individual disk being formed of a projecting annular surface to each side of which is adjacent an annular congé or concave quarter-round, substantially as set forth.

2. In grooved rollers for covering wire with rubber or the like, a series of individual grooved disks $g$, each grooved disk $g$ being formed of a projecting annular surface $g'$ to each side of which is adjacent an annular congé or concave quarter-round $g^2$, substantially as set forth.

3. In grooved rollers for covering wire with rubber or the like, the combination of rotary shafts $a$, $b$, lateral flanges $e$, $f$, a series of grooved disks $g$, disposed between said flanges $e$ and $f$ respectively, each grooved disk $g$ being formed of a projecting annular surface $g'$ to each side of which is adjacent an annular congé $g^2$, and means for uniting together said lateral flanges $e$, $f$ and disks $g$, substantially as set forth.

4. In grooved rollers for covering wire with rubber or the like, the combination of rotary shafts $a$, $b$, lateral flanges $e$, $f$, a series of grooved disks $g$ disposed between said flanges $e$ and $f$ respectively, each grooved disk $g$ being formed of a projecting annular surface $g'$ to each side of which is adjacent an annular congé $g^2$, means for uniting together said lateral flanges $e$, $f$ and disks $g$, and means for uniting also said disks $g$ independently of said flanges $e$, $f$, substantially as set forth.

5. In grooved rollers for covering wire with rubber or the like, the combination of rotary shafts $a$, $b$, lateral flanges $e$ and $f$ keyed upon the shafts $a$ and $b$ respectively, the disks $g$ disposed between said flanges $e$ and $f$ respectively, each grooved disk $g$ being formed of a projecting annular surface $g'$ to each side of which is adjacent an annular congé $g^2$, means for uniting together said lateral flanges $e$, $f$ and disks $g$, the annular disks $e'$ on the sides of the flanges $e$, and the annular recesses on the sides of the flanges $f$, said parts $e'$, $e$, $g$ and $f'$, $f$, $g$ meshing together, substantially as set forth.

6. In grooved rollers for covering wire with rubber or the like, the combination of rotary shafts $a$, $b$, lateral flanges $e$ and $f$ keyed upon said shafts $a$, $b$ and provided with annular shoulders $e^4$ and $f^4$ respectively, each grooved disk $b$ being formed of a projecting annular surface $g'$ to each side of which is adjacent an annular congé $g^2$, means for uniting together said lateral flanges $e$, $f$ and disks $g$, means for uniting also said disks $g$ independently of said flanges $e$, $f$, and the overlapping disks $m$ fixed to the sides of the flanges $e$, said parts $e^4$, $e$, $g$ and $f^4$, $f$, $g$ meshing together, substantially as set forth.

In witness whereof I have hereunto signed my name, this 1st day of March, 1902, in the presence of two subscribing witnesses.

CONRAD FELSING, Jun.

Witnesses:
 August Hirsch,
 Johann Knöfel.